United States Patent
Emberling et al.

(10) Patent No.: US 12,517,771 B2
(45) Date of Patent: Jan. 6, 2026

(54) HARDWARE SUPPORTED SPLIT BARRIER

(71) Applicant: Advanced Micro Devices, Inc., Santa Clara, CA (US)

(72) Inventors: Brian Emberling, Santa Clara, CA (US); Joseph L Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 649 days.

(21) Appl. No.: 17/562,934

(22) Filed: Dec. 27, 2021

(65) Prior Publication Data

US 2023/0205608 A1    Jun. 29, 2023

(51) Int. Cl.
*G06F 9/52* (2006.01)
*G06F 9/30* (2018.01)
*G06F 9/54* (2006.01)

(52) U.S. Cl.
CPC ............ *G06F 9/522* (2013.01); *G06F 9/3005* (2013.01); *G06F 9/30087* (2013.01); *G06F 9/542* (2013.01)

(58) Field of Classification Search
CPC .......... G06F 9/522; G06F 9/38; G06F 9/3887; G06F 9/542; G06T 2210/52; G06T 1/20
See application file for complete search history.

(56) References Cited

U.S. PATENT DOCUMENTS

| | | | |
|---|---|---|---|
| 9,218,223 B2* | 12/2015 | Gaster | G06F 9/3851 |
| 9,448,803 B2* | 9/2016 | Lindholm | G06F 9/3834 |
| 10,067,768 B2* | 9/2018 | Diamos | G06F 9/38885 |
| 11,061,742 B2* | 7/2021 | Pawlowski | G06F 9/30087 |
| 11,803,380 B2* | 10/2023 | Giroux | G06F 9/3838 |
| 2020/0356419 A1* | 11/2020 | Jacob | G06F 9/546 |
| 2023/0153176 A1* | 5/2023 | Mei | G06F 9/522 |
| | | | 718/102 |

* cited by examiner

*Primary Examiner* — Lewis A Bullock, Jr.
*Assistant Examiner* — John Robert Dakita Ewald
(74) *Attorney, Agent, or Firm* — Volpe Koenig

(57) ABSTRACT

A disclosed technique includes executing, for a first wavefront, a barrier arrival notification instruction, for a first barrier, indicating arrival at a first barrier point; performing, for the first wavefront, work prior to the first barrier point; executing, for the first wavefront, a barrier check instruction; and executing, for the first wavefront, at a control flow path based on a result of the barrier check instruction.

20 Claims, 7 Drawing Sheets

HARDWARE SUPPORTED SPLIT BARRIER

BACKGROUND

Massively parallel processors such as graphics processing units have requirements for coordination among parallel threads. Barriers are a mechanism that support such coordination. Improvements to barriers are constantly being made.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes executing, for a first wavefront, a barrier arrival notification instruction, for a first barrier, indicating arrival at a first barrier point; performing, for the first wavefront, work prior to the first barrier point; executing, for the first wavefront, a barrier check instruction; and executing, for the first wavefront, at a control flow path based on a result of the barrier check instruction.

Figure 1:
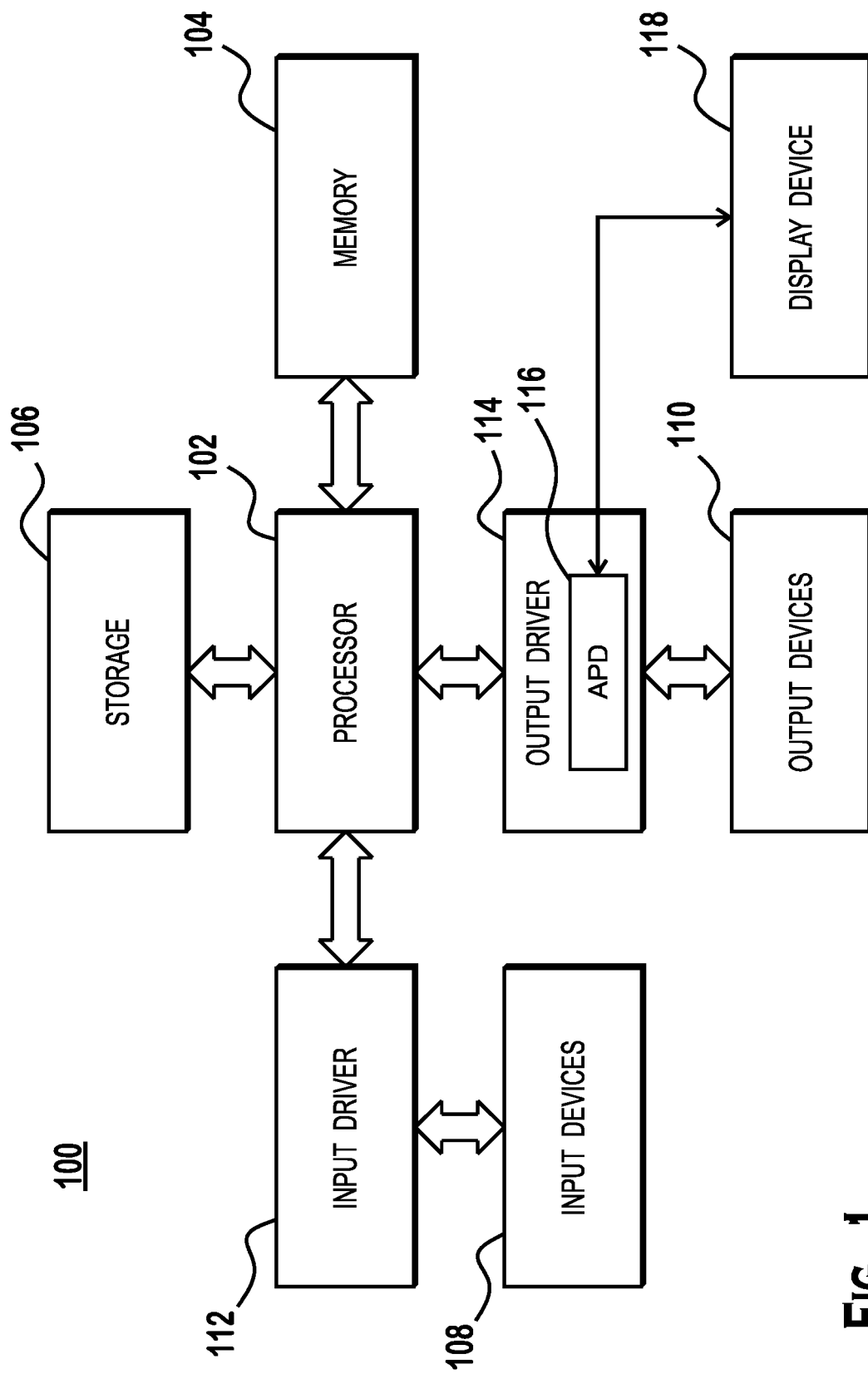
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of communication media like wireless IEEE 802 signals). The output devices 110 include, without limitation, a display, a speaker, a printer, a haptic feedback device, one or more lights, an antenna, or a network connection (e.g., a wireless local area network card for transmission and/or reception of communication media like wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
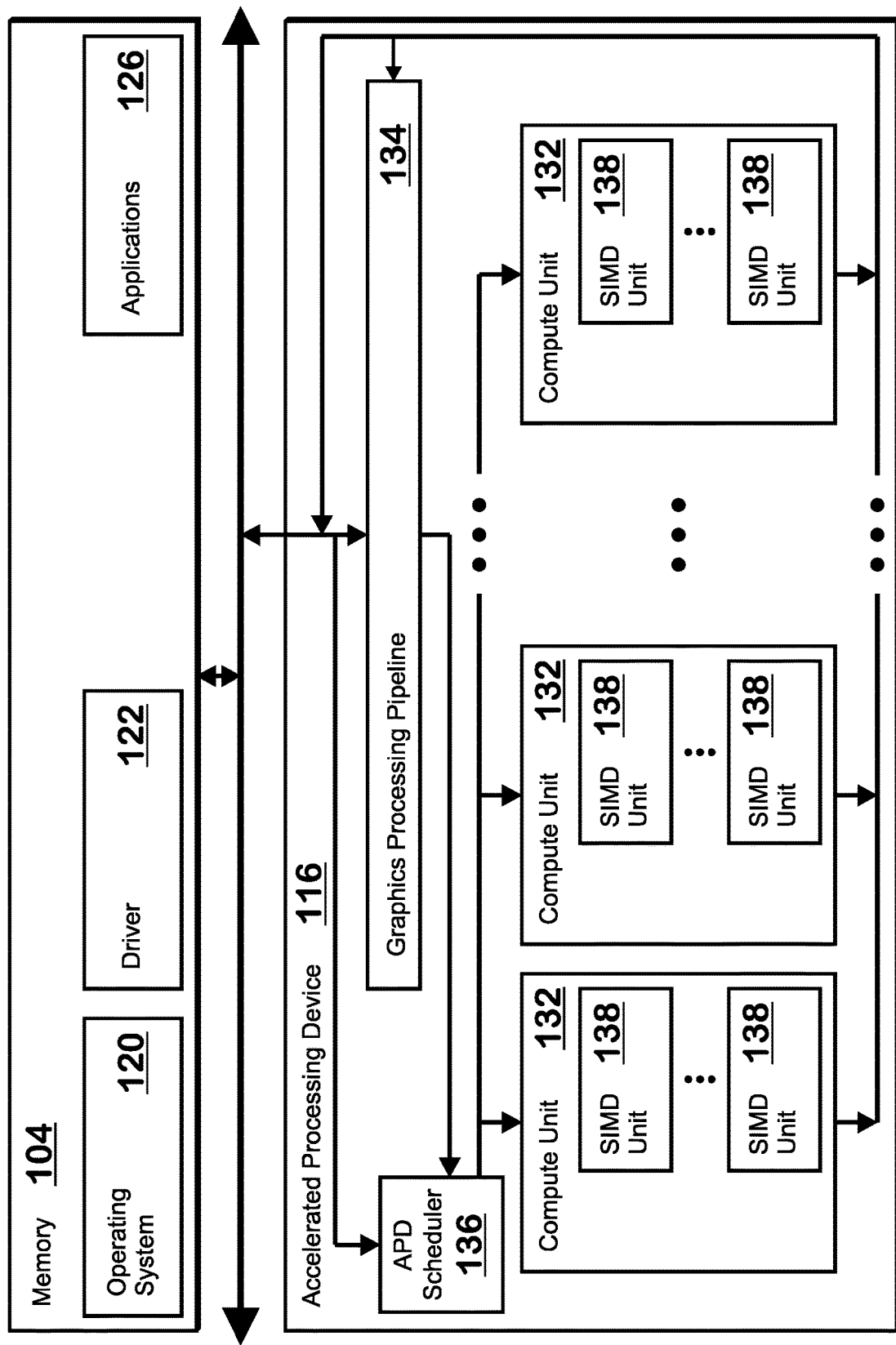
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and nongraphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
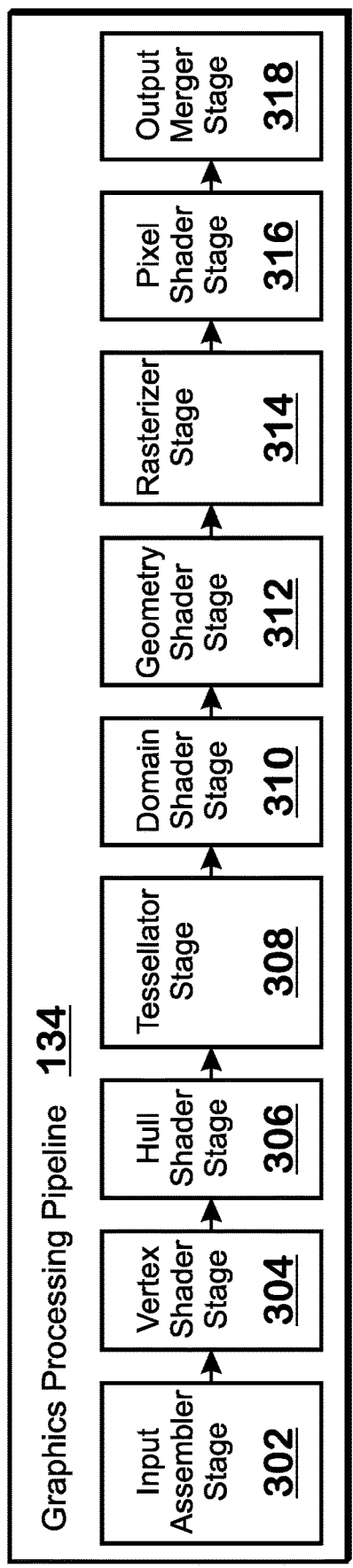
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Although described as including a graphics processing pipeline 134, it should be understood that the teachings of the present disclosure apply to devices that do not include a graphics processing pipeline 134 and/or that do not perform graphics operations.

The SIMD units 138 are capable of executing barrier instructions for wavefronts. Barrier instructions (or, sometimes, "barriers") prevent wavefronts that have arrived at a barrier from proceeding past the barrier until all wavefronts that are participating in the barrier have arrived at the barrier. It is possible for all wavefronts of a workgroup to participate in a barrier, or for a subset of the wavefronts of a workgroup to participate in a barrier.

Some barriers are non-split barriers. When a wavefront executes a non-split barrier, the wavefront waits to proceed past the barrier until all wavefronts participating in the barrier have arrived at the barrier. During this wait, the wavefront is stalled and does not perform any execution. Other barriers are split barriers. With a split barrier, signaling that a wavefront has arrived at the barrier and waiting to proceed past the barrier are separate operations. A wavefront that has arrived at a split barrier and has signaled that the wavefront has arrived at the barrier is permitted to keep executing. A split barrier includes a barrier arrival notification instruction and a barrier check instruction. The barrier arrival notification instruction notifies other wavefronts that the wavefront executing the barrier arrival notification instruction has arrived at that barrier. The barrier check instruction acts as (or is used in conjunction with) a conditional branch instruction that is conditional on whether the barrier has been satisfied. If the barrier has been satisfied, then the barrier check instruction causes control to flow to a point considered to be after the barrier. If the barrier has not been satisfied, then the barrier check instruction causes the wavefront to wait until the barrier has been satisfied.

Figure 4:
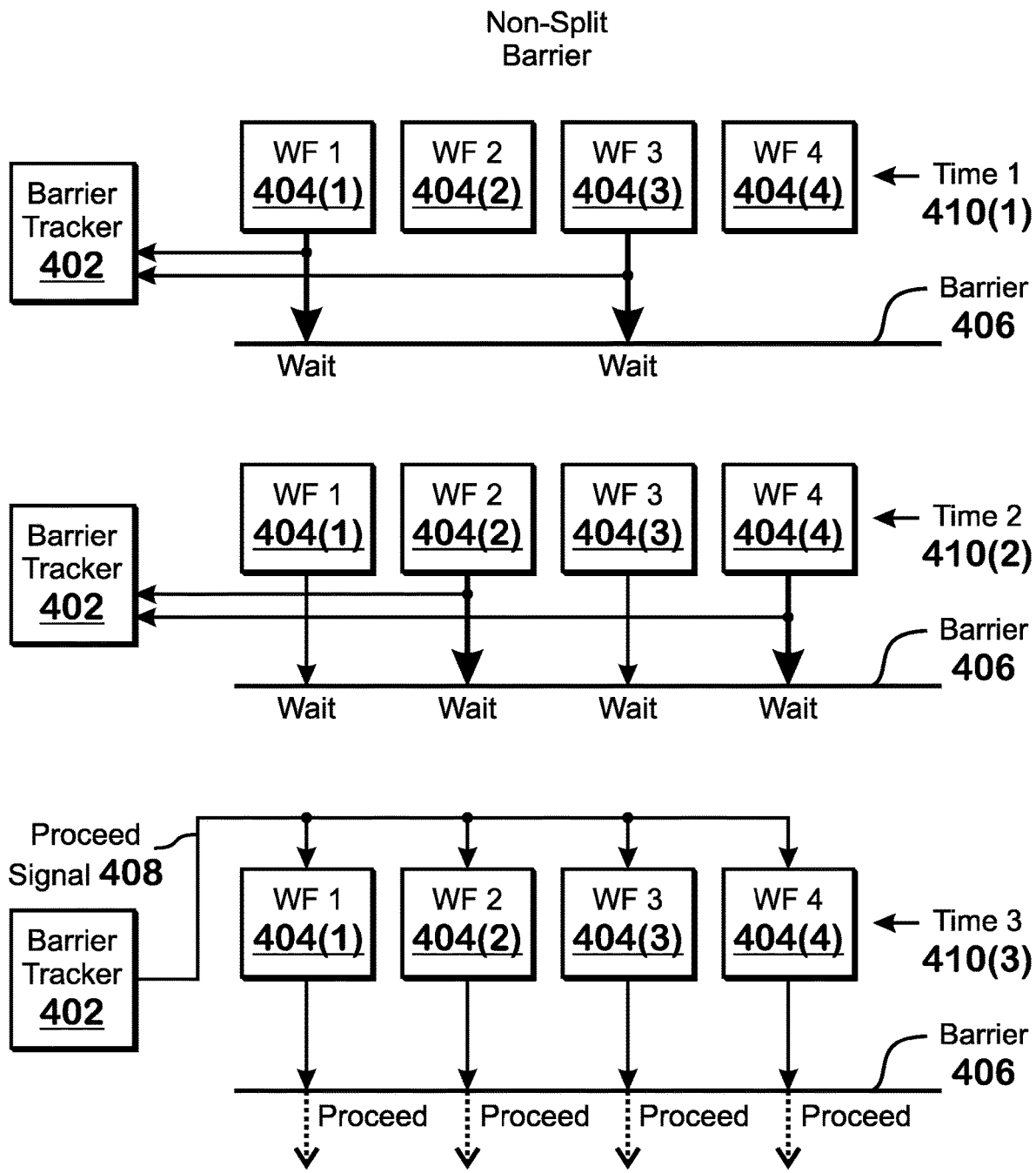
FIG. 4 illustrates operations for a non-split barrier, according to an example.

FIG. 4 illustrates operations for a non-split barrier, according to an example. A barrier tracker 402 is a hardware circuit included within or operationally coupled to the compute units 132. Note that the wavefronts 404 are given reference numbers 404(X), where X is a number that uniquely identifies a particular wavefront 404. The reference number 404 as used herein refers generically to any one, multiple, or all of the wavefronts. The barrier tracker 402 maintains information indicating which wavefronts 404 of a set of wavefronts 404 participating in a barrier 406 have arrived at the barrier 406. After all wavefronts 404 participating in the barrier 406 have arrived at the barrier 406, the barrier tracker 402 informs each wavefront 404 of such arrival. After a wavefront 404 has arrived at the barrier 406, but before all participating wavefronts 404 have arrived at the barrier 406, the wavefronts 404 that have arrived are waiting. After all wavefronts 404 have arrived at the barrier 406, the barrier tracker 402 sends a "proceed" signal 408 to each participating wavefront 404. Each participating wavefront 404 then proceeds past the barrier 406.

In the example of FIG. 4, at time 1 410(1), wavefront 1 404(1) and wavefront 3 404(3) have arrived at the barrier 406. Thus these wavefronts 404 have signaled the barrier tracker 402 and are waiting, meaning these wavefronts 404 are not performing any other operations. Wavefront 2 404(2) and wavefront 4 404(4) have not yet arrived at the barrier 406 and are performing work before the barrier 406.

At time 2 410(2), wavefront 2 404(2) and wavefront 404(4) have arrived at the barrier and signal the barrier tracker 402. At time 410(3), the barrier tracker 402 determines that all participating wavefronts 404 have arrived at the barrier and thus transmit a barrier signal 408 to each such wavefront 404. As a result, each such wavefront 404 proceeds past the barrier 406.

In the example of FIG. 4, in which a non-split barrier is used, the wavefronts execute a barrier instruction which serves both as notification of arrival at the barrier and as an instruction to pause execution. Thus when each such wavefront executes such a barrier instruction, the wavefront pauses execution until all wavefronts have arrived at the barrier.

In an example, a non-split barrier is implemented by the barrier tracker 402 using an "up-down counter." The up-down counter alternates between counting up and down in tracking whether each participating wavefront has arrived at the barrier. In a first instance, for a first barrier, each time the barrier tracker 402 receives an indication from a wavefront 404 that the wavefront 404 has arrived at the barrier, the barrier tracker 402 increments a counter value. When the counter value arrives at a maximum number indicative of the number of participating wavefronts 404, the barrier tracker 402 signals the wavefronts 404 to proceed past the barrier. After this, the barrier tracker 402 switches to counting down. Specifically, the barrier tracker 402 decrements the value when a wavefront 404 arrives at the barrier and when the counter is zero, the barrier tracker 402 signals each wavefront to proceed. This mechanism has the drawback that it is only possible to track one barrier at a time.

Figure 5:
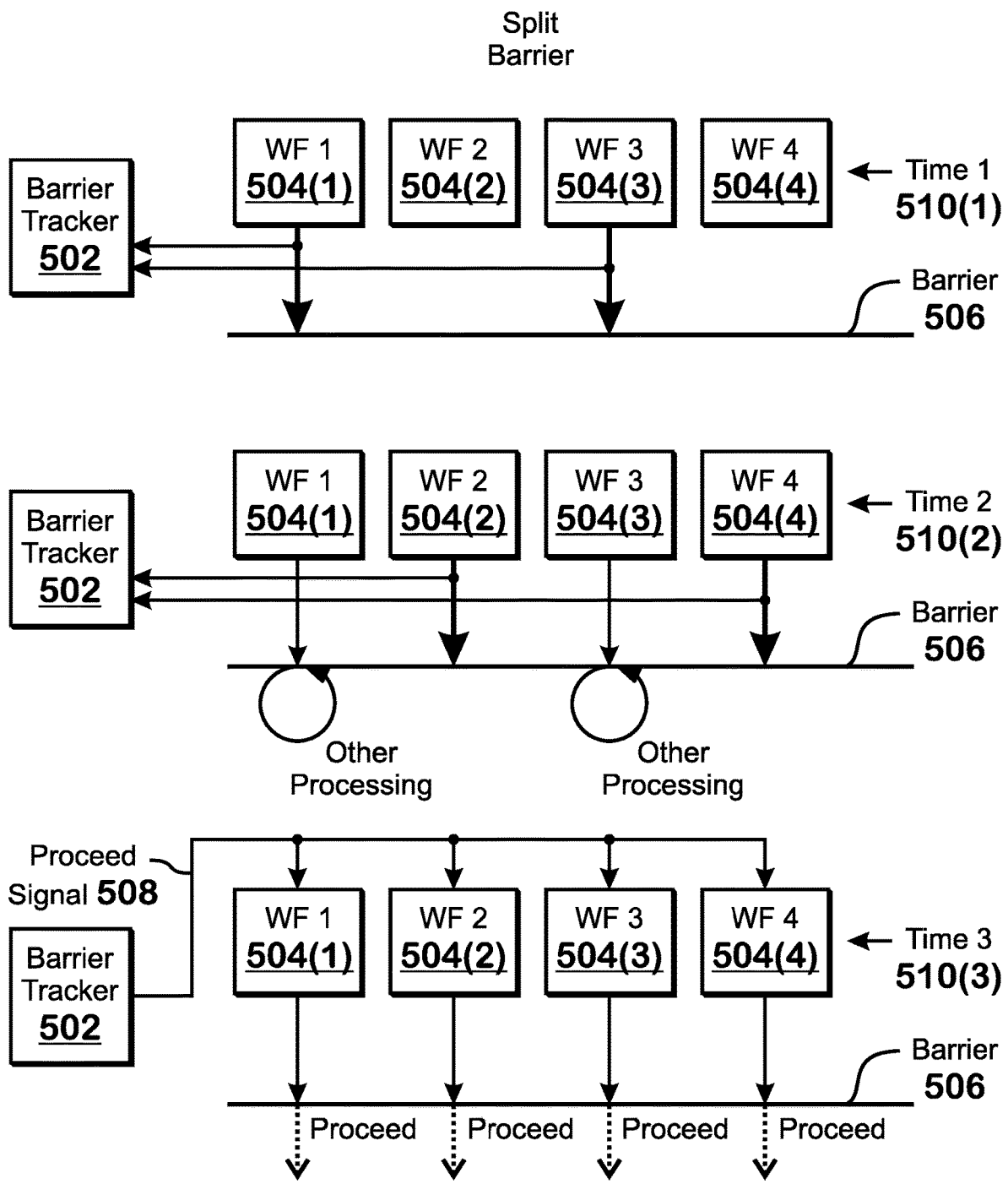
FIG. 5 illustrates operations for a split barrier, according to an example.

FIG. 5 illustrates operations for a split barrier, according to an example. With a split barrier, the wavefronts 504 that are participating in the barrier 506 first execute a barrier arrival notification instruction. This instruction notifies the barrier tracker 502 that the wavefront 504 has arrived at the barrier. After a wavefront 504 executes this instruction and before all wavefronts 504 have arrived at the barrier 506, the wavefront 504 is able to execute other work that is not subsequent to the barrier 506. After execution of the barrier arrival instruction, which causes the barrier arrival notification, the wavefront 504 is permitted to execute other work that is not subsequent to the barrier 506. Eventually, the wavefront 504 can run out of work that may be executed before the barrier 506, and thus the wavefront 504 issues an instruction to check the barrier. If the barrier is not yet satisfied (i.e., not all participating wavefronts have yet issued an arrival notification to the barrier) then this wavefront will stall, go to sleep, or stop executing instructions in some other manner. The wavefront could begin spin-looping in hardware, but the wavefront is not permitted to issue any further instructions that are after the barrier check instruction in program order. Then, when the barrier tracker 502 determines that all wavefronts 504 have executed the barrier arrival notification instruction, the barrier tracker 502 informs each wavefront 504 of such event. In response to this notification, the wavefronts 504 proceed past the barrier

506. The barrier tracker 502 is a hardware circuit configured to perform the steps described herein.

The work performed by a wavefront 504 that has executed the barrier arrival notification instruction but that has not yet been instructed to proceed past the corresponding barrier check instruction includes any type of work.

It is possible for such a wavefront 504 to execute a barrier arrival notification instruction again, even before proceeding past the first barrier mentioned above. Such a barrier arrival notification instruction would be an indication that the wavefront 504 is ready to execute past a different barrier check instruction. In some examples, each barrier arrival notification instruction explicitly specifies the associated barrier check instruction. In other words, barrier arrival notification instructions and barrier check instructions explicitly include "a barrier name" or a "barrier index." The barrier arrival notification instruction acts as an indication that a wavefront is ready to proceed past the barrier check instruction having the same name. In some instances, it is possible for the names to be supplied implicitly, for example, based on order of execution of the instruction, based on instruction address, or based on some other mechanism.

In some examples, the barrier tracker 502 tracks multiple barrier names, where each barrier name refers to a different barrier. The barrier tracker 502 includes data indicating, for each barrier name, which wavefronts 504 have arrived at the barrier and which wavefronts 504 have not arrived at the barrier. The term "arrived at the barrier" herein means executed the barrier arrival notification instruction. When all wavefronts 504 have arrived at a barrier for a particular named barrier, the barrier tracker 502 indicates to the wavefronts 504 that those wavefronts 504 are permitted to proceed past the named barrier, once those wavefronts 504 arrive at the corresponding barrier wait operation, or if those wavefronts 504 have already arrived at the corresponding barrier wait operation. This mechanism supports named barriers as well as implementations that do not permit barrier naming, since independently tracking multiple barriers allows recording of independent instances of execution of the barrier arrival notification instruction. More specifically, in the event that a wavefront executes multiple barrier arrival notification instructions before being allowed to proceed past a first barrier, the barrier tracker 502 is able to keep track of this information. It should be understood that a "barrier" as used herein means the combination of a barrier arrival notification instruction and barrier check instruction that is designated through some mechanism (e.g., explicitly or implicitly) to be paired together. For example, each such pair can share a barrier name or can share some other explicit or implicit barrier specifier.

Some barrier instructions are capable of specifying a wavefront participation mask. In implementations that support such barrier instructions, the wavefront participation mask specifies which wavefronts out of a set of wavefronts will participate in the barrier. In some examples, the set of wavefronts is all wavefronts of a workgroup. In other examples, the set of wavefronts is defined in a different manner. In such examples, the barrier tracker 502 tracks, for a barrier, whether a wavefront has arrived, and whether the wavefront is participating in the barrier. When all participating wavefronts have executed the barrier arrival notification instruction, the barrier tracker 502 indicates to such wavefronts that those wavefronts can proceed past the barrier. At this point, when any such wavefront executes the barrier check instruction, that instruction causes the wavefront 404 to proceed past to the point deemed to be after the barrier. In examples without a participation mask, some default set of wavefronts is included in the barrier, such as all wavefronts of a workgroup or some other set of wavefronts.

In the example of FIG. 5, at time 1 510(1) wavefront 1 504(1) and wavefront 3 504(3) arrive at the barrier—execute the barrier arrival notification instruction. However, wavefront 504(2) and wavefront 4 504(4) have not. The barrier tracker 502 tracks that wavefront 1 504(1) and wavefront 3 504(3) have arrived at the barrier.

At time 2 510(2), wavefront 2 504(2) and wavefront 504(4) execute the barrier arrival notification instruction. The barrier tracker tracks that wavefront 2 504(2) and wavefront 4 504(4) have arrived at the barrier 506. Also at time 2 510(2), wavefront 1 504(1) and wavefront 504(3) are not stopped and perform work that is not past the barrier 506. At time 3 510(3), the barrier tracker 502 indicates, via proceed signal 508 to each of the wavefronts 504 that those wavefronts are allowed to proceed past the barrier 506.

Figure 6:
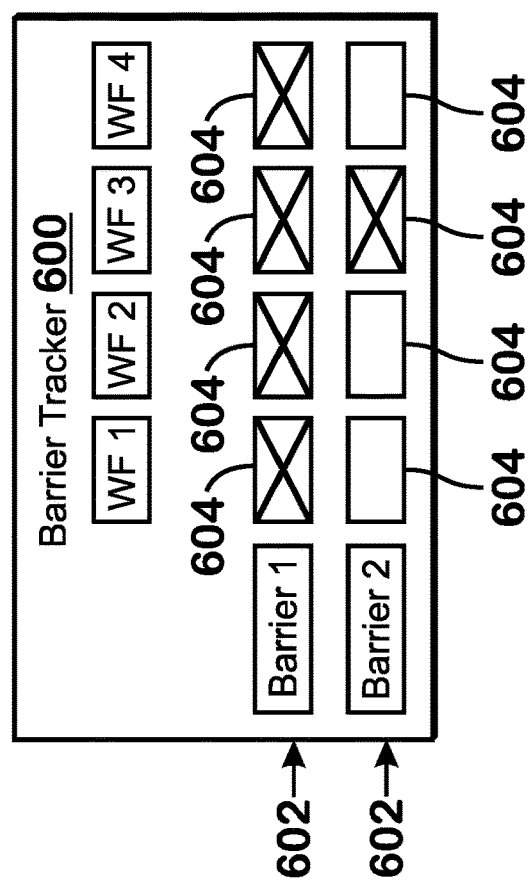
FIG. 6 illustrates an example barrier tracker.

FIG. 6 illustrates an example barrier tracker 600. The barrier tracker includes several barrier tracker entries 602, each associated with a different barrier. Each barrier tracker entry 602 includes a number of barrier tracker wavefront elements 604. Each wavefront element 604 indicates whether or not a particular wavefront has arrived at a particular barrier. In FIG. 6, an X indicates that the wavefront has arrived at a barrier, and a blank space indicates that the wavefront has not arrived at the barrier. The wavefront element can be any technically feasible item of data such as a bit or other amount of data.

Figure 7:
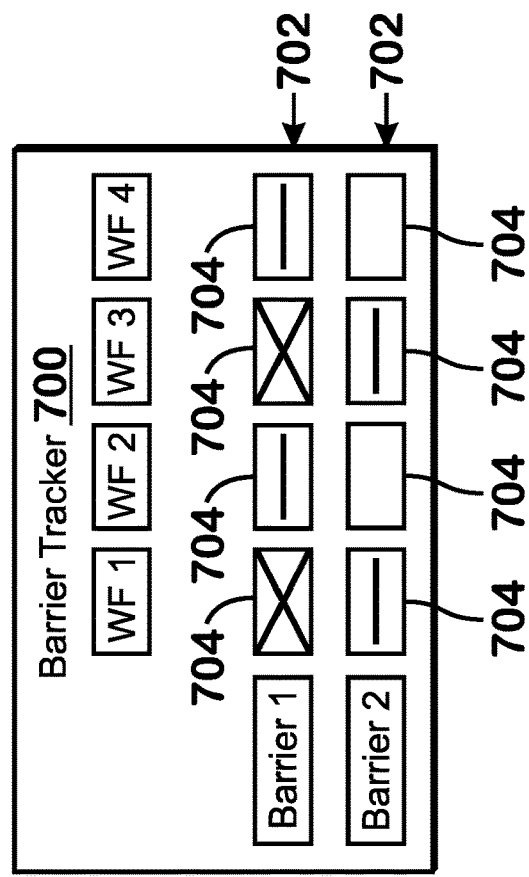
FIG. 7 illustrates another example barrier tracker.

FIG. 7 illustrates another example barrier tracker 700. The barrier tracker includes several barrier tracker entries 702, each associated with a different barrier. Each barrier tracker entry 704 includes a number of barrier tracker wavefront elements 704. Each wavefront element 704 indicates whether a wavefront has arrived at a particular barrier and whether a wavefront is participating in the barrier. In the figure, a horizontal line indicates that a wavefront is not participating in the barrier. An 'X' means that a wavefront is participating in the barrier and has arrived at the barrier, and a blank space indicates that a wavefront is participating in the barrier and has not arrived at the barrier. Each wavefront element can be any technically feasible item of data.

The techniques described herein are more efficient than what a user would need to do without the techniques. More specifically, if a barrier were implemented in software, then the software would need to repeatedly poll a data value that another wave would have to set to indicate that a barrier would be reached. In an example, each wave would have to poll the data value to determine if that value is 0 or is equal to the number of waves to determine whether all waves have reached the barrier. In the hardware implementation described herein, when a wavefront arrives at a barrier check instruction and the barrier is not yet ready, the wavefront is put to sleep, which frees resources for other wavefronts to execute. When a last wavefront executes the barrier arrival notification instruction, the hardware informs all wavefronts participating in the barrier that all wavefronts have arrived at the barrier. Each wavefront wakes up and then proceeds past the barrier check instruction.

Figure 8:
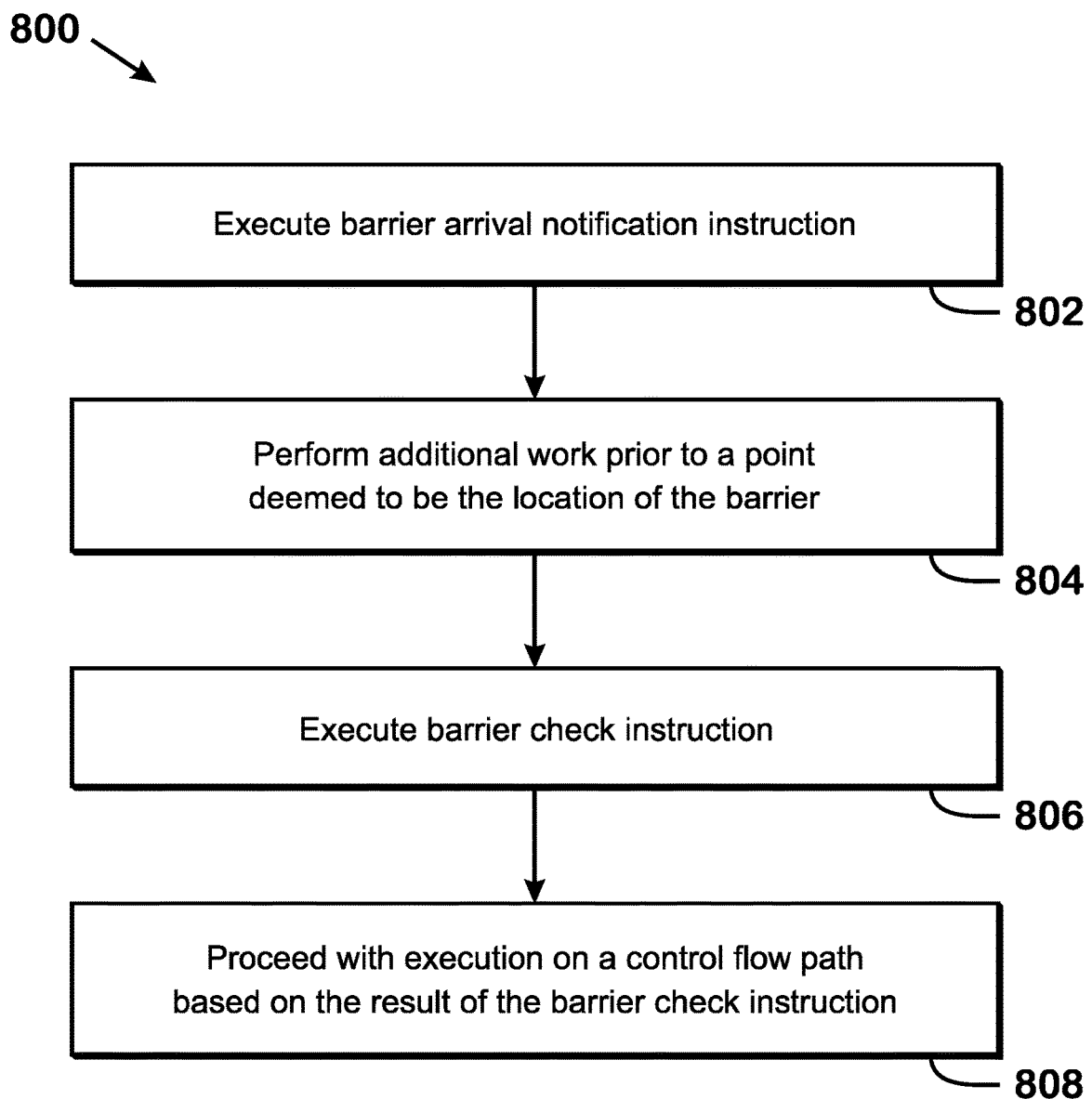
FIG. 8 is a flow diagram of a method for performing barrier operations, according to an example.

FIG. 8 is a flow diagram of a method 800 for performing barrier operations, according to an example. Although described with respect to the system of FIGS. 1-7, those of skill in the art will understand that any system configured to perform the steps of the method 800 in any technically feasible order falls within the scope of the present disclosure.

At step 802, a wavefront executes a barrier arrival notification instruction. This instruction informs the APD 116 that the wavefront is ready to proceed past a point that is defined as "the barrier" (this act is sometimes referred to herein as "proceeding past the barrier." Proceeding past the barrier means executing a barrier check instruction with a result that control flows to a point deemed to be past the barrier. This action is contrasted with not proceeding past the barrier, which occurs where a wavefront executes a barrier check instruction with a result that control flows to a point deemed to be not past the barrier (such as at the beginning of a loop).

At step 804, the wavefront performs additional work prior to the barrier. More specifically, after the wavefront executes the barrier arrival notification instruction, the wavefront executes other instructions before arriving at the barrier check instruction.

At step 806, the wavefront performs the execute barrier check instruction. This instruction produces a result that either causes the wavefront to proceed past the barrier or to not proceed past the barrier. If all wavefronts participating in the barrier have executed the barrier arrival notification instruction for that barrier, then the barrier check instruction allows the wavefront to proceed past the barrier and if not all wavefronts participating in the barrier have executed the barrier arrival notification instruction for that barrier, then the barrier check instruction does not allow the wavefront to proceed past the barrier. Again, proceeding past the barrier means that control flows to a point designated to be past the barrier and not proceeding past the barrier means that control flows to a point designated to be not past the barrier.

At step 808, the wavefront proceeds with execution on a control flow path based on the result of the barrier check instruction. As stated above, this step involves transferring to either a point deemed to be past a barrier or to a point deemed to be not past a barrier, based on whether all wavefront participating in the barrier have executed the barrier arrival notification instruction.

Although it is described that the barrier check instruction itself performs branching (i.e., transfers control flow to a particular point in a program), in some implementations, the barrier check instruction is an instruction that checks a condition and sets a flag for a subsequent branch instruction. In such an implementation, the barrier check instruction would set a flag based on whether all participating wavefronts have arrived at the barrier, and a subsequent conditional branch instruction checks the flag and branches either to the point considered to be after the barrier or a point considered to be before the barrier, based on the value of the flag. In other implementations, the barrier check instruction causes the executing wavefront to wait at the barrier check instruction, rather than proceed past the barrier check instruction. In such implementations, the barrier check instruction would cause the wavefront to sleep, stall, or otherwise stop executing instructions.

The various functional units illustrated in the figures and/or described herein (including, but not limited to, the processor 102, the input driver 112, the input devices 108, the output driver 114, the output devices 110, the APD 116, the APD scheduler 136, the graphics processing pipeline 134, the compute units 132, the SIMD units 138, each stage of the graphics processing pipeline 134 illustrated in FIG. 3, and the barrier tracker 402, barrier tracker 502, barrier tracker 600, and barrier tracker 700) may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). Non-transitory computer-readable storage mediums do not include transitory elements or mediums such as signals.

What is claimed is:

1. A method for performing barrier-related operations, comprising:
   executing, for a subset of first barrier name wavefronts for a first barrier name, a barrier arrival notification instruction that is part of a barrier and that includes the first barrier name, indicating that the first barrier name wavefronts participate in the first barrier name;
   based on execution of the barrier arrival notification instruction, executing, by the subset, additional work designated as prior to the barrier, while wavefronts of the first barrier name wavefronts that have not executed the barrier arrival notification instruction continue processing;
   subsequent to executing the additional work, executing, by the subset, a barrier check instruction for the first barrier name, wherein executing the barrier check instruction includes determining that remaining wavefronts of the first barrier name wavefronts have not arrived at the barrier;
   prior to the remaining wavefronts executing the barrier arrival notification for the first barrier name, performing, by the subset, work that is designated as not past the barrier while the remaining wavefronts continue executing, wherein the work includes re-executing, by the subset, the barrier arrival notification instruction for the first barrier name; and
   upon all wavefronts of the first barrier name wavefronts executing the barrier check instruction for the first barrier name, executing, for the first barrier name wavefronts, at a control flow path designated as after the barrier.

2. The method of claim 1, wherein:
the barrier arrival notification instruction is executed prior to executing the barrier check instruction.

3. The method of claim 2, wherein executing the barrier check instruction by all wavefronts of the first barrier name comprises, in response to determining that all wavefronts participating in the first barrier name have executed the barrier arrival notification instruction, determining that all the wavefronts are to proceed past a barrier point.

4. The method of claim 1, wherein:
prior to executing the barrier check instruction, not all wavefronts participating in the first barrier have executed a barrier arrival notification instruction.

5. The method of claim 4, wherein executing the barrier check instruction by the subset comprises determining that the subset is not to proceed past a barrier point.

6. The method of claim 5, wherein performing the work that is designated as not past the barrier comprises either executing one or more instructions at a point that is not past the barrier point or executing no instructions.

7. The method of claim 1, further comprising:
tracking, in a data structure, information indicating which wavefronts have executed the barrier arrival notification instruction for the barrier.

8. The method of claim 7, wherein the information includes information indicating whether one or more wavefronts are not participating in the barrier.

9. A system, comprising:
a memory configured to store instructions; and
a processor configured to execute the instructions, and to:
execute, for a subset of first barrier name wavefronts for a first barrier name, a barrier arrival notification instruction that is part of a barrier and that includes the first barrier name, indicating that the first barrier name wavefronts participate in the first barrier name;
based on execution of the barrier arrival notification instruction, execute, by the subset, additional work designated as prior to the barrier, while wavefronts of the first barrier name wavefronts that have not executed the barrier arrival notification instruction continue processing;
subsequent to executing the additional work, execute, by the subset, a barrier check instruction for the first barrier name, wherein executing the barrier check instruction includes determining that remaining wavefronts of the first barrier name wavefronts have not arrived at the barrier;
prior to the remaining wavefronts executing the barrier arrival notification for the first barrier name, performing, by the subset, work that is designated as not past the barrier while the remaining wavefronts continue executing, wherein the work includes re-executing, by the subset, the barrier arrival notification instruction for the first barrier name; and
upon all wavefronts of the first barrier name wavefronts executing the barrier check instruction for the first barrier name, executing, for the first barrier name wavefronts, at a control flow path designated as after the barrier.

10. The system of claim 9, wherein:
the barrier arrival notification instruction is executed prior to the barrier check instruction.

11. The system of claim 10, wherein executing the barrier check instruction by all wavefronts of the first barrier name comprises, in response to determining that all wavefronts participating in the first barrier name have executed the barrier arrival notification instruction, determining that all the wavefronts are to proceed past a first barrier point.

12. The system of claim 9, wherein:
prior to executing the barrier check instruction, not all wavefronts participating in the first barrier have executed a barrier arrival notification instruction.

13. The system of claim 12, wherein executing the barrier check instruction by the subset comprises determining that the subset is not to proceed past a barrier point.

14. The system of claim 13, wherein performing the work that is designated as not past the barrier comprises either executing one or more instructions at a point that is not past the barrier point or executing no instructions.

15. The system of claim 9, wherein the processor is further configured to:
track, in a data structure, information including which wavefronts have executed the barrier arrival notification instruction for the barrier.

16. The system of claim 15, wherein the information includes information indicating whether one or more wavefronts are not participating in the barrier.

17. A non-transitory computer-readable medium storing instructions that, when executed by a processor, cause the processor to perform operations including:
executing, for a subset of first barrier name wavefronts for a first barrier name, a barrier arrival notification instruction that is part of a barrier and that includes the first barrier name, indicating that the first barrier name wavefronts participate in the first barrier name;
based on execution of the barrier arrival notification instruction, execute, by the subset, additional work designated as prior to the barrier, while wavefronts of the first barrier name wavefronts that have not executed the barrier arrival notification instruction continue processing;
subsequent to executing the additional work, execute, by the subset, a barrier check instruction for the first barrier name, wherein executing the barrier check instruction includes determining that remaining wavefronts of the first barrier name wavefronts have not arrived at the barrier;
prior to the remaining wavefronts executing the barrier arrival notification for the first barrier name, performing, by the subset, work that is designated as not past the barrier while the remaining wavefronts continue executing, wherein the work includes re-executing, by the subset, the barrier arrival notification instruction for the first barrier name; and
upon all wavefronts of the first barrier name wavefronts executing the barrier check instruction for the first barrier name, executing, for the first barrier name wavefronts, at a control flow path designated as after the barrier.

18. The non-transitory computer-readable medium of claim 17, wherein:
the barrier arrival notification instruction is executed prior to the barrier check instruction.

19. The non-transitory computer-readable medium of claim 18, wherein executing the barrier check instruction by all wavefronts of the first barrier name comprises, in response to determining that all wavefronts participating in the first barrier name have executed the barrier arrival notification instruction, determining that all the wavefronts are to proceed past a first barrier point.

20. The non-transitory computer readable medium of claim 17, wherein:

prior to executing the barrier check instruction, not all wavefronts participating in the first barrier have executed a barrier arrival notification instruction.

* * * * *